United States Patent [19]
Nakazaki et al.

[11] Patent Number: 5,456,119
[45] Date of Patent: Oct. 10, 1995

[54] SENSING ELEMENT FOR VEHICLE LOAD MEASURING DEVICE

[75] Inventors: Yoji Nakazaki; Naoya Takahashi, both of Shizuoka, Japan

[73] Assignee: Yazaki Corporation, Tokyo, Japan

[21] Appl. No.: 205,729

[22] Filed: Mar. 4, 1994

[30] Foreign Application Priority Data

| Mar. 4, 1993 | [JP] | Japan | 5-008811 U |
| Mar. 4, 1993 | [JP] | Japan | 5-043920 |
| Jan. 26, 1994 | [JP] | Japan | 6-006814 |

[51] Int. Cl.$^6$ ............................................. G01G 19/12
[52] U.S. Cl. ......................... 73/841; 73/815; 73/768; 73/781; 73/862.472
[58] Field of Search ................... 73/841, 815, 862.57, 73/768, 781, 855, 862.472, 862.631, 862.632

[56] References Cited

U.S. PATENT DOCUMENTS

| 2,458,481 | 1/1949 | Ruge | 73/781 |
| 3,350,926 | 11/1967 | Webb | 73/781 |
| 3,620,074 | 11/1971 | Laimins et al. | 73/862.631 |
| 3,643,498 | 2/1972 | Hardin | 73/815 |
| 3,754,610 | 8/1973 | Paelian et al. | 73/862.631 |
| 4,422,341 | 12/1983 | Espiritu Santo et al. | 73/862.57 |
| 4,576,053 | 3/1986 | Hatamura | 73/862.631 |
| 4,858,475 | 8/1989 | Jacobson et al. | 73/862.57 X |
| 5,243,146 | 9/1993 | Nishitani | 177/136 |

FOREIGN PATENT DOCUMENTS

| 57-20630 | 2/1982 | Japan | 73/862.632 |
| 60-23687 | 7/1985 | Japan . | |
| 61-14333 | 1/1986 | Japan . | |
| 61-144435 | 9/1986 | Japan . | |
| 62-274223 | 11/1987 | Japan . | |
| 4109140 | 4/1992 | Japan | 73/841 |

*Primary Examiner*—Richard E. Chilcot, Jr.
*Assistant Examiner*—George M. Dombroske
*Attorney, Agent, or Firm*—Sughrue, Mion, Zinn, Macpeak & Seas

[57] ABSTRACT

A sensing element in a load measuring device includes two cylindrical holders, each having a hole along the central axis; and a plate-shaped member provided between the two cylindrical holders, the plate-shaped member having protrusions at both ends, a coil being provided on a center portion of the plate-shaped member, wherein the cylindrical holders is welded to the plate-shaped member with the protrusions engaged with the holes in the two cylindrical holders.

6 Claims, 9 Drawing Sheets

SENSING ELEMENT FOR VEHICLE LOAD MEASURING DEVICE

BACKGROUND OF THE INVENTION

1. Field of the Invention

This invention relates to a sensing element for a vehicle load measuring device, and more particularly to a pin-shaped sensing element which is set in a pin or shaft to which a vehicle load is applied, to detect the vehicle load by using a shearing force applied to the pin or shaft. The invention relates further to methods of fixing a sensing element, and more particularly to a method of fixing a sensing element in which a hole is formed in a cylindrical pin or shaft to which a shearing force is applied by a vehicle load, and a strain detecting sensing element is fixedly fitted in the hole thus formed. The invention relates further to sensing elements and methods of fixing them, and more particularly to a strain detecting sensing element which is fitted in a hole formed in a cylindrical pin or shaft to which a shearing force is applied by a vehicle load, and a method of fixing the sensing element.

2. Related Art

Heretofore, a vehicle load measurement is given mainly to large vehicles such as trucks. This is to eliminate the difficulty that if a truck is over-loaded, then it is adversely affected in operating characteristic. Not only may a traffic accident may occur, but also the truck itself and the road itself be damaged.

In general, the vehicle load measurement is performed using a load measuring device set on the road as follows: That is, with a wheel of the vehicle set on a loading plate having a load converter, the wheel load or the axle load of the wheel is measured. The loads thus obtained are summed up to obtain a vehicle load. The total of the weights of persons on the truck and the weight of the truck are subtracted from the vehicle load thus obtained, to obtain the weight of the load on the truck.

The vehicle load measuring device is disadvantageous in the following points: The device is bulky, and is high in installation cost, and therefore not only the place where the device is to be installed but also the number of vehicle load measuring devices which can be installed is limited. Hence, the number of vehicles whose loads can be measured with the device is only a fraction of the total number of vehicles. That is, the conventional vehicle load measuring device is insufficient to prevent all the vehicles from over-loading.

In order to eliminate this difficulty, a so-called "self load meter" has been proposed in the art, which is designed as follows: A sensing element such as a strain gauge type sensor is welded onto the axle casing of a vehicle. The sensing element operates to detect the bending strain which, when a load on the load-carrying platform is applied to the axle, occurs with the axle. Thus, with the meter, each vehicle is able to measure its load by itself.

However, the self load meter of this type suffers from the following difficulty: When the axle is inclined for instance because the place such as a road where the vehicle is positioned is poor, then even if the load on the vehicle is maintained, the vector of the load applied to the axle changes, and accordingly the amount of strain of the sensing element changes, so that the resultant detection value is not correct.

SUMMARY OF THE INVENTION

An object of this invention is to provide a sensing element which is free from the difficulty that its detection value is adversely affected when the vector of a load applied to an axle changes in direction, and a method of positively fixing the sensing element.

Another object of the invention is to provide a method of positively fixing a cylindrical sensing element in a hole formed in a pin or shaft.

A further object of the invention is to provide a sensing element for a vehicle load measuring device which is in the form of a pin, is scarcely off-centered, and whose material can be readily obtained.

In a first aspect of the preset invention, there is provided that a sensing element in a vehicle load measuring device comprising: two cylindrical holders, each having a hole along the central axis; and a plate-shaped member between the two cylindrical holders, the plate-shaped member having protrusions at both ends, wherein the cylindrical holders are welded to the plate-shaped member with the protrusions engaged with the holes in the two cylindrical holders.

In a second aspect of the present invention, there is provided a sensing element in a vehicle load measuring device comprising a capsule member including two cylindrical holders, which have holes rectangular in section along the central axis, and are connected to each other through arms; and a plate-shaped member between the two cylindrical holders, wherein the plate-shaped member is welded to the two cylindrical holders with the plate-shaped member inserted into the hole of one of the two cylindrical holders from outside and then into the hole of the other cylindrical holder.

According to a third aspect of the present invention, there is provided a strain detecting sensing element comprising two substantially cylindrical holders provided at both ends; and a plate-shaped member provided between the two holders, on which a coil is wound at a center portion thereof.

According to a fourth aspect of the present invention, there is provided a strain detecting sensing element comprising a circular-truncated-cone-shaped holder provided at one end, the end portion of which is tapered; a cylindrical holder at the other end; and a plate-shaped member between the two holders on which a coil is provided at a center portion thereof, wherein the cylindrical holder has a key groove in the surface in the longitudinal direction thereof and lead wire grooves through which the lead wires of the coil are extended.

According to a fifth aspect of the present invention, there is provided a method for fixing a sensing element comprising the steps of: forming a hole in a cylindrical pin or shaft in the thrust direction thereof to which a load is applied such as shearing force; cooling the sensing element to contract and then fitting the sensing element into the hole provided in the pin or shaft; expanding the sensing element so as to be fixedly secured in the hole of the pin or shaft.

The method described above further comprises that before the sensing element is fitted in the hole of the pin or shaft, the pin or shaft is expanded by heating.

In the above-described method, according to the invention, the sensing element is cooled to −150° C. or lower, and the pin or shaft is heated substantially to about 80° C.

According to a sixth embodiment of the present invention, there is provided a method for fixing a sensing element comprising the steps of: forming a hole in a cylindrical pin or shaft in the thrust direction thereof to which a load is applied as shearing force; forming a groove in the cylindrical surface of the hole of the pin or shaft in the thrust direction; forming a groove in the surface of the sensing element in the thrust direction; inserting the sensing element into the hole of the pin or shaft; inserting a fixing member into a space defined by the groove of the pin or shaft and the groove of the sensing element to fixedly secure the latter in the hole of the pin or shaft.

The method of the present invention further comprises: forming a hole in the pin or shaft so that the deep end portion thereof is tapered inwardly; and inserting a key into a key groove defined by the sensing element to fixedly secured it in the hole of the pin or shaft.

According to the invention, the plate-shaped member having the sensing section will never be bent or deformed during manufacture, and accordingly the holders at both ends are maintained aligned with each other at all times. Therefore, the pin-shaped sensing element can be smoothly fitted, for instance, into the hole of the shackle pin.

In the case of a sensing element of magneto-striction type, only its middle portion, namely, the plate-shaped member may be made of a permalloy material, which can be readily obtained.

The sensing element constructed as described above is fixedly secured as follows: First, the sensing element is contracted by cooling, and then it is fitted in the hole of the pin or shaft after being aligned with the latter. Under this condition, the sensing element and the pin or shaft are left to stand at room temperature. As a result, the sensing element expands to fixedly engaged with the hole of the pin or shaft. Alternatively, before the cooled sensing element is engaged with the hole of the pin or shaft, the latter may be expanded by heating. In this case, the sensing element can be more readily fitted in the hole of the pin or shaft.

In the case where the groove is formed in the cylindrical surface of the hole of the pin or shaft in the thrust direction, and the groove or cut is formed in the surface of the sensing element in the thrust direction, the diameter of the hole of the pin or shaft is made slightly larger than the diameter of the sensing element, so that the latter can be readily inserted into the hole of the pin or shaft. After the sensing element is inserted into the hole of the pin or shaft, the fixing member is inserted into the space defined by the groove of the pin or shaft and the groove or cut of the sensing element, to fixedly secure the sensing element in the hole of the pin or shaft.

In the case where the hole in the pin or shaft is so formed that the deep end portion thereof is tapered inwardly, and one end portion of the sensing element is also tapered, and the key groove is formed in the other end portion; with the sensing element inserted into the hole of the pin or shaft and the key is inserted into the key groove, to fixedly secure the sensing element in the hole of the pin or shaft.

DETAILED DESCRIPTION OF THE PREFERRED EMBODIMENTS

Preferred embodiments will now be described to the references with the accompanying drawings.

Figure 10:
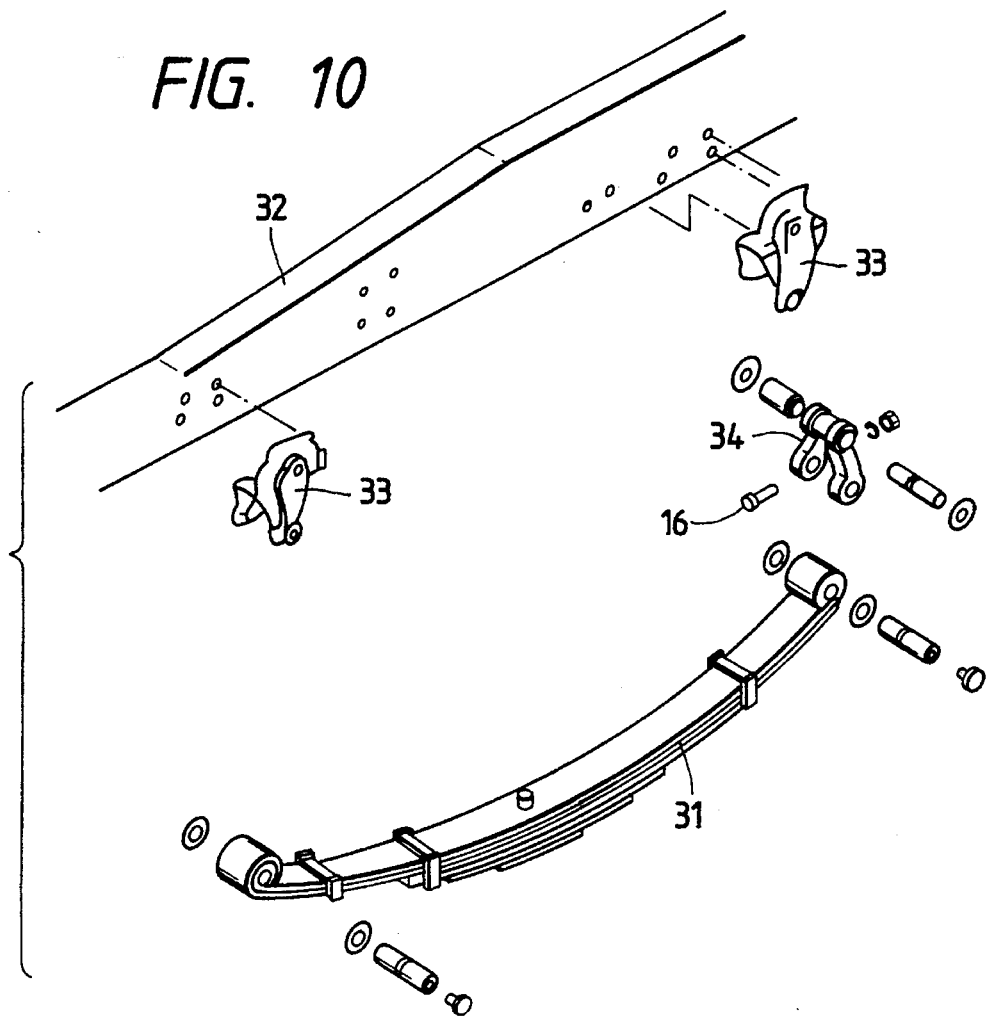
FIG. 10 is an exploded perspective view showing a structure for supporting a leaf spring on a load-carrying platform frame.

In general, a large vehicle such as a truck, as shown in FIG. 10, has leaf springs 31 as suspension means. One end of each of the leaf springs 31 is supported by a bracket 33 secured to a load-carrying platform frame 32, and the other end is supported by another bracket 33 through a shackle 34. The middle of the leaf spring 31 is coupled to an axle (axle casing), so that the load on the vehicle is applied from the load-carrying platform frame 32 through the brackets 33 and the shackle 34 to the axle (axle casing).

First embodiment

Figure 11A:
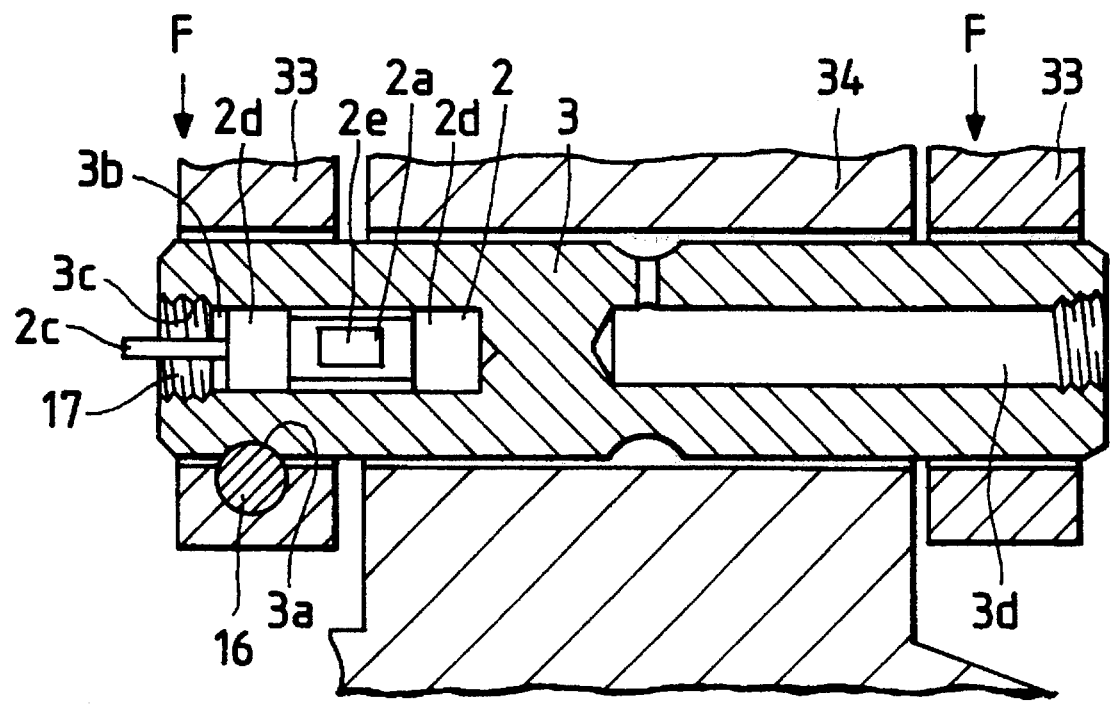
FIGS. 11(a) and (b) are a sectional view and a side view, respectively, showing a shackle pin of a vehicle to which the sensing element of the first embodiment of the present invention according to the invention.

FIG. 11(a) is a sectional view of a vehicle load measuring device, which constitutes a first embodiment of this invention.

As shown in FIG. 11(a), a cylindrical shackle pin 3 is inserted into a bracket 33 secured to a load-carrying platform frame 32 (FIG. 10), and a shackle 34 is swingably mounted on the shackle pin 3.

A groove 3a is formed in the surface of one end portion of the shackle pin 3. The bracket 33 is combined with the shackle 34 as follows: That is, a pin fixing bolt 16 is inserted into the groove 3a through a hole formed in the side of the bracket 3, and tightened, so that the shackle pin 3 is prevented from turning with respect to the bracket 33.

As shown in FIG. 11(a), a hole 3b threaded as indicated at 3c is formed in the one end portion of the shackle pin 33 along the central axis, and a strain gauge type sensing element 2 is fitted in the hole 3b. The sensing element 2 is made up of a magnetic material such as permalloy, and its both end portions are cylindrical holders 2d, and the middle portion is a plate-shaped member 2e. A sensing section comprises a resistance line 2a is bonded to the plate-shaped member 2e. A lead wire 2c is connected to the resistance line 2a, and is extended outside through the hole 3b of the shackle pin 3.

Figure 11B:
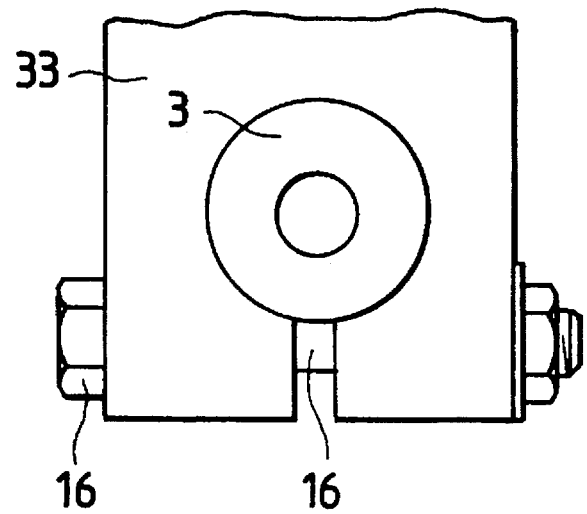

A mud guard plug 17 is threadably engaged with the hole 3b of the shackle pin 3. The plug 17 has a through-hole through which the lead wire 2c is extended. A grease supplying hole 3d is formed in the other end portion of the shackle pin 3. FIG. 11(b) is a sectional view of the components shown in FIG. 11(a).

The vehicle load measuring device is constructed as described above. Hence, when a vehicle load F is applied to the shackle pin 3 through the bracket 33, a shearing force acts on the latter 3, and the sensing element in the shackle pin 3 is strained, so that the output of the sensing element changes to detect the load on the vehicle. Only the shearing force acts on the sensing element 2, and therefore the detection value is never affected by the inclination of the road or the like.

The vehicle load measuring device is formed by utilizing the shackle pin 3, which is an existing component of the vehicle. Hence, the vehicle load measuring device can be readily provided for the vehicle. On the other hand, the shackle pin 3 originally has the grease supplying hole in one end portion. Therefore, even if the hole smaller in diameter for accommodating the sensing element is formed in the other end portion, it will never adversely affect the mechanical strength of the shackle pin.

As was described above, the positioning groove 3a is formed in the surface of the shackle pin 3. Therefore, if, in fitting the sensing element 2 into the hole 3b of the shackle pin 3, the direction of load to the sensing element is set up, then the shackle pin 3 can be fixed so as not to be turned with respect to the bracket 33. That is, when the shackle pin 3 is fixedly fitted in the bracket 33, the pin fixing bolt 17 is inserted into the positioning groove 3a through the hole in the side of the bracket 33 and then tightened, so that the shackle pin 3 is prevented from turning with respect to the bracket. Thus, the direction of load with respect to the sensing element will not change.

In setting the direction of load to the sensing element, the following method should be employed: After the sensing element is positioned in place in the hole 3b of the shackle pin 3, it is positively fixed in it so that it may not move.

For this purpose, the following sensing element fixing methods are employed: In the first method, with an adhesive agent applied to the surface of the sensing element, the latter is engaged with the hole of the shackle. In the second method, a small hole is formed in the shackle pin 3 in such a manner that it is extended radially of the latter 3, and a heating beam is applied through the small hole thus formed to weld the surface of the sensing element thereby to fix the latter. In the third method, the sensing element 3 is press-fitted into the hole 3b of the shackle pin 3.

Further, in order to positively transmit the deformation of the shackle pin 3 to the sensing section of the sensing element 2 fitted in the cylindrical hole 3b of the shackle pin 3, both cylindrical end portions of the sensing element 3 must be accurately coaxial with each other; otherwise, it is impossible to fit the sensing element 3 into the hole 3b.

However, sometimes the two cylindrical end portions of the sensing element may not be coaxial, because they are formed by machining a bar-shaped material, and its middle portion is like a plate.

In the case where the sensing element is of magnetostriction type, it must be made of a permalloy material. However, it is difficult to obtain a permalloy material whose thickness is large enough to form the sensing element as one unit.

The first method of using an adhesive agent to fix the sensing element is disadvantageous in that it is rather difficult to sufficiently fix the sensing element with the adhesive agent, and the latter is limited in heat resistance. The second method using a heating beam to weld the sensing element is rather troublesome in practical use, because it is necessary to form the small hole through which the heating beam is applied, and the heating beam must be positioned accurately. The third method of press-fitting the sensing element suffers from a difficulty that, when the sensing element is press-fitted into the hole of the shackle pin, a great load is applied to the sensing element, so that the latter may be deformed, with its characteristic adversely affected by the residual stress.

Second embodiment

In relation with the above-described first embodiment, other embodiments of the invention will be described with reference to the accompanying drawings. In those embodiments, parts corresponding functionally to those which have been described with reference to the first embodiments are therefore designated by the same reference numerals or characters.

Figure 12A:
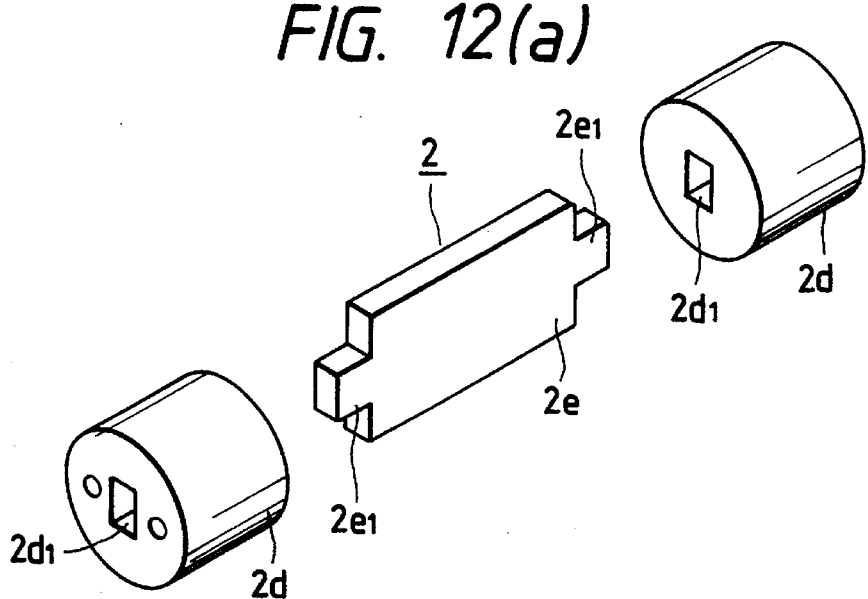
FIG. 12(a) is an exploded perspective view showing a sensing element for a vehicle load measuring device according to a second embodiment of the present invention.

FIG. 12(a) is an exploded perspective view showing a sensing element of a vehicle load measuring device, which constitutes a second embodiment of the invention. Its sensing section is not shown in FIG. 12(a).

As shown in FIG. 12(a), the sensing element 2 comprises: two cylindrical end portions, namely, holders 2d having central holes $2d_1$; and a plate-shaped member 2e with protrusions $2e_1$ at both ends.

Figure 12B:
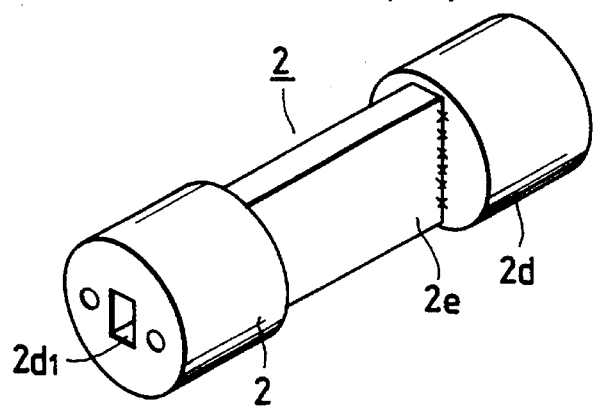
FIG. 12(b) is a diagram showing the sensing element of the second embodiment of the present invention, which has been assembled.

The sensing element 2 is formed as shown in FIG. 12(b). That is, the protrusions $2e_1$ of the plate-shaped member 2e are engaged with the central holes $2d_1$ of the holders 2d, respectively, and then the plate-shaped member 2e is welded to the holders 2d.

Figure 13:
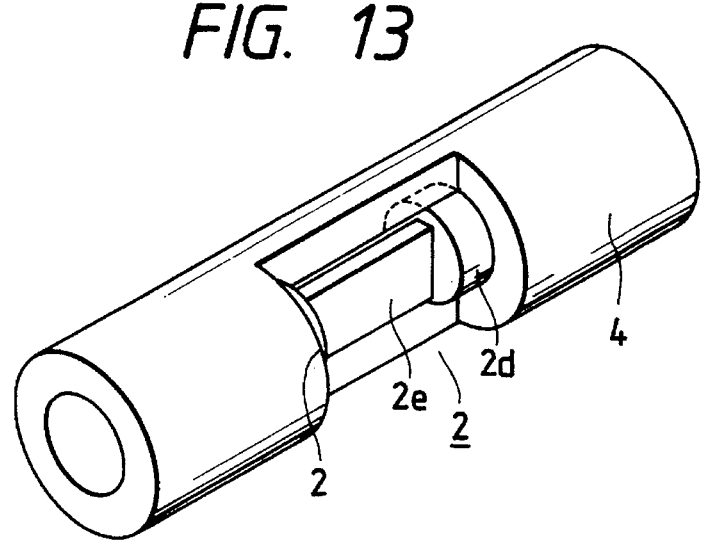
FIG. 13 is a perspective diagram for a description of a method of preventing the misalignment of both end holders of the sensing element of the second embodiment of the present invention.

In this assembling operation, in order to accurately align the holders 2d of the sensing element 2 with each other, it is preferable to use an eccentricity preventing jig 4 as shown in FIG. 13. That is, it is desirable that the welding operation is carried out with the holders 2d held with the eccentricity preventing jig 14.

In the second embodiment, the sensing element 2 is formed as described above. Hence, the plate-shaped member 2e, where the sensing section is provided, will never be bent or deformed when manufactured, and accordingly the holders 2d at both ends of the sensing element are in alignment with each other at all times. Furthermore, in the case where the sensing element 2 is of magneto-striction type, only its middle portion; i.e., the plate-shaped member 2e is made of a material such as permalloy. Such a material can be readily obtained.

The sensing element 2 thus formed is fitted in the hole 3b of the shackle pin 3 as shown in FIG. 11. In this operation, an adhesive agent is applied to the surface of the holders 2d, so that the sensing element 2 is fixedly secured in the hole 3b of the shackle pin 3.

Third embodiment

Now, a third embodiment of the invention will be described with reference to FIGS. 14(a) through 14(c), in which parts corresponding functionally to those which have been described with reference to the first and second embodiments are therefore designated by the same reference numerals or characters.

Figure 14A:
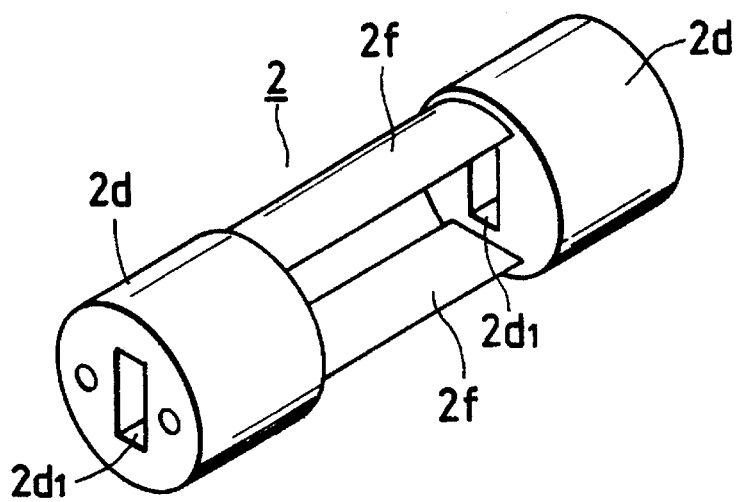
FIG. 14(a) is a perspective view of a capsule member of a sensing element according to a third embodiment of the present invention.

FIG. 14(a) shows a capsule member of a vehicle load measuring device, which constitutes the third embodiment of the invention. The capsule member comprises: two cylindrical holders 2d at both ends which have central holes $2d_1$ substantially rectangular in section, respectively; and arms 2f through which the two cylindrical holders 2d are connected to each other in such a manner that they are in alignment with each other. The holders and the arms form one unit.

Figure 14B:
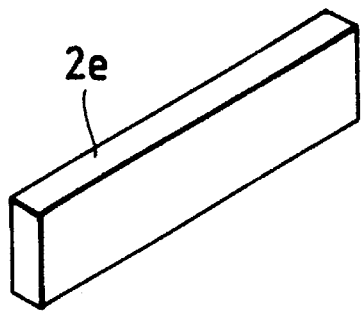
FIG. 14(b) is a perspective view of a plate-shaped member of the sensing element of the third embodiment of the present invention.
Figure 14C:
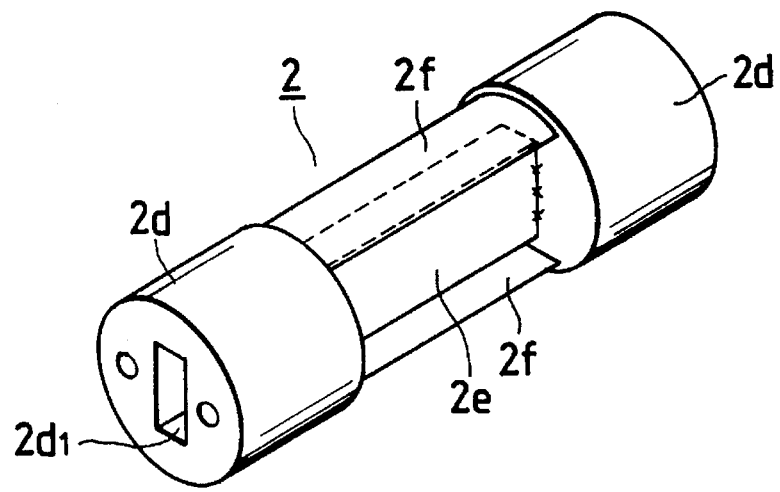
FIG. 14(c) is a perspective view of the sensing element of the third embodiment of the present invention, which has been assembled.

FIG. 14(b) shows a plate-shaped member 2e having a sensing section (not shown) at the center. As shown in FIG. 14(c), the plate-shaped member 2e is inserted into the hole $2d_1$ of one of the holders 2d from outside, and then into the hole $2d_1$ of the other holder 2d. Under this condition, the plate-shaped member 2e is welded to the holders 2d along the four sides of each of the openings of the latter 2d, to fabricate the aimed sensing element 2. The specific features of the sensing element 2 thus formed is equal to those of the above-described embodiments.

As was described above, the sensing element for the vehicle load measuring device is provided according to the first or second embodiment of the invention which is in the form of a pin and is scarcely off-centered, and can be made with the material which is readily available.

Fourth embodiment

Figure 1:
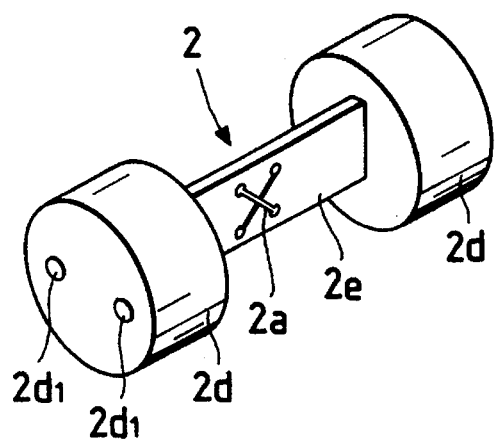
FIG. 1 is a perspective view of a sensing element according a fourth embodiment of this invention.

FIG. 1 is a perspective view of a fourth embodiment of the sensing element according to the invention.

The sensing element 2 is made of a magnetic material. As shown in FIG. 1, both end portions of the sensing element 2 are formed into cylindrical holders 2d, and the middle portion therebetween is a plate-shaped member 2e having four holes. A sensing section, namely, a coil (resistance line) 2a is wound by using those four holes. Two lead wires are connected to both ends of the coil 2a, and are extended through two holes $2d_1$ formed in one of the holders 2d.

Fifth embodiment

A fifth embodiment of the sensing element according to the invention will be described with reference to FIG. 2.

Figure 2A:
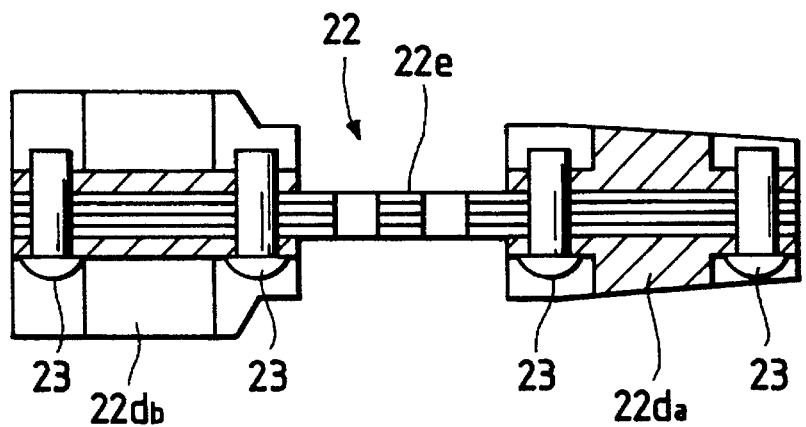
FIGS. 2(a)–(c) are a sectional view and side views of the sensing element of a fifth embodiment of the present invention, respectively.
Figure 2B:
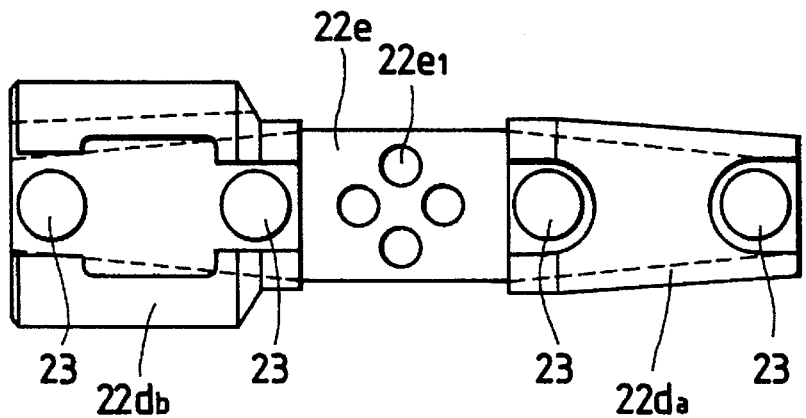
Figure 2C:
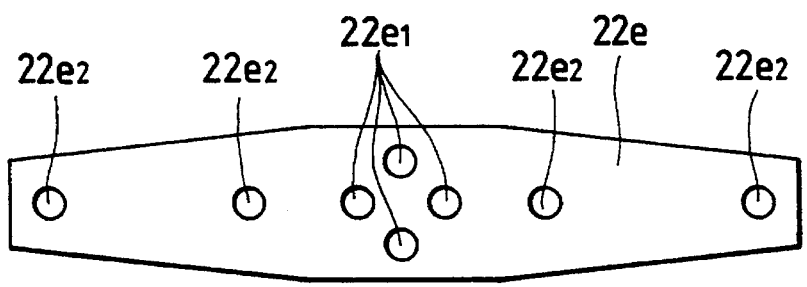

The sensing element 22, as shown in FIGS. 2(a) and (b), comprises a plate-shaped member 22e formed by stacking four plates of magnetic material such as permalloy. As shown in FIG. 2(c), the plate-shaped member 22e has holes $22e_1$ at the center which are used for winding a coil, and fixing holes $22e_2$ on both sides of the holes $22e_1$ which are used for fixing the plate-shaped member 22e to holders (described latter).

The sensing element 22 has a circular-truncated-cone-shaped holder $22d_a$ at one of its ends. The holder $22d_a$ has a through-hole rectangular in section along its central axis, into which one end portion of the above-described plate-shaped member 22e is inserted, and through-holes in the sides which are used to fixedly secure the holder to the plate-shaped member 22e by caulking rivets 23.

Figure 3:
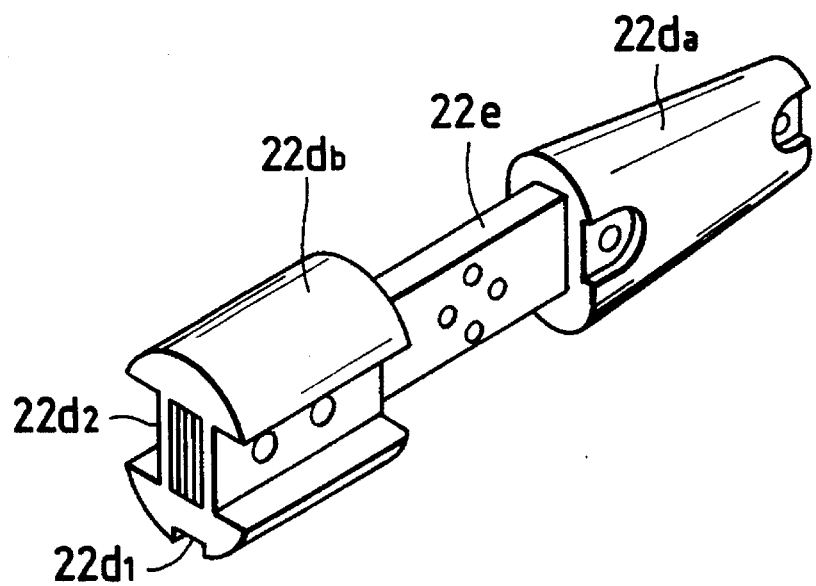
FIG. 3 is a perspective view showing another example of the sensing element according to the fifth embodiment of the invention.

The sensing element 22 has a cylindrical holder $22d_b$ at the other end. The cylindrical holder $22d_b$ has a through-hole rectangular in section, into which the other end portion of the above-described plate-shaped member 22e is inserted, and through-holes in the sides which are used to fixedly secure the holder to the plate-shaped member 22e by caulking rivets 23. Furthermore, the cylindrical holder $22d_b$, as shown in FIG. 3, has a key groove $22d_1$ and lead wire grooves $22d_2$ through which lead wires connected to the ends of the coil are extended.

Both end portions of the plate-shaped member 22e are inserted into the two holders $22d_a$ and $22d_b$, respectively, and the former are secured to the latter with the rivets 23, and the lead wires of the coil are extended through the lead wire grooves $22d_2$. Thus, the sensing element 22 has been fabricated.

Figure 4A:
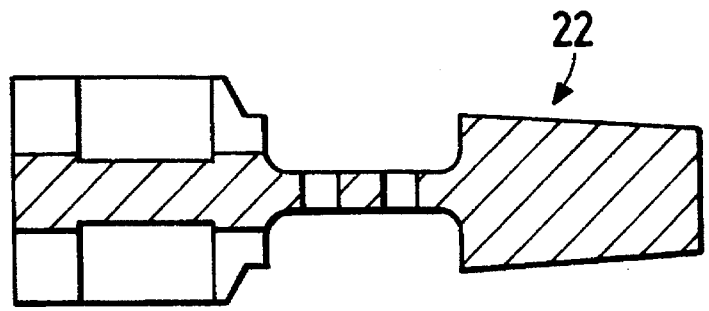
FIGS. 4(a) and (b) are a sectional view and a side view of the sensing element, respectively of the fifth embodiment of the present invention.
Figure 4B:
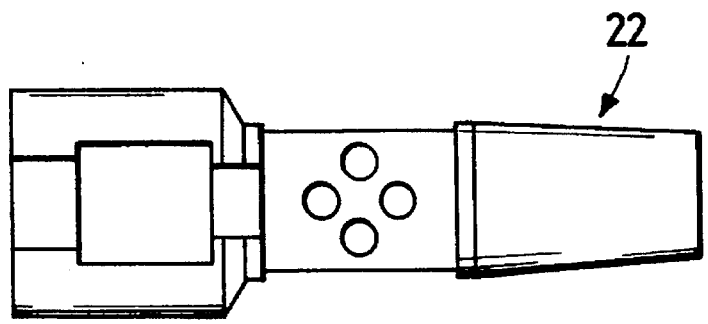

In the sensing element 22, the plate-shaped member 22e and the holders 22d are not integral with each other, being provided as separate parts; however, they may be formed as one unit by using a permalloy material or the like, as shown in FIGS. 4(a) and (b).

Now, methods of fixing the sensing element 2 or 22 will be described with reference to FIG. 5.

Figure 5:
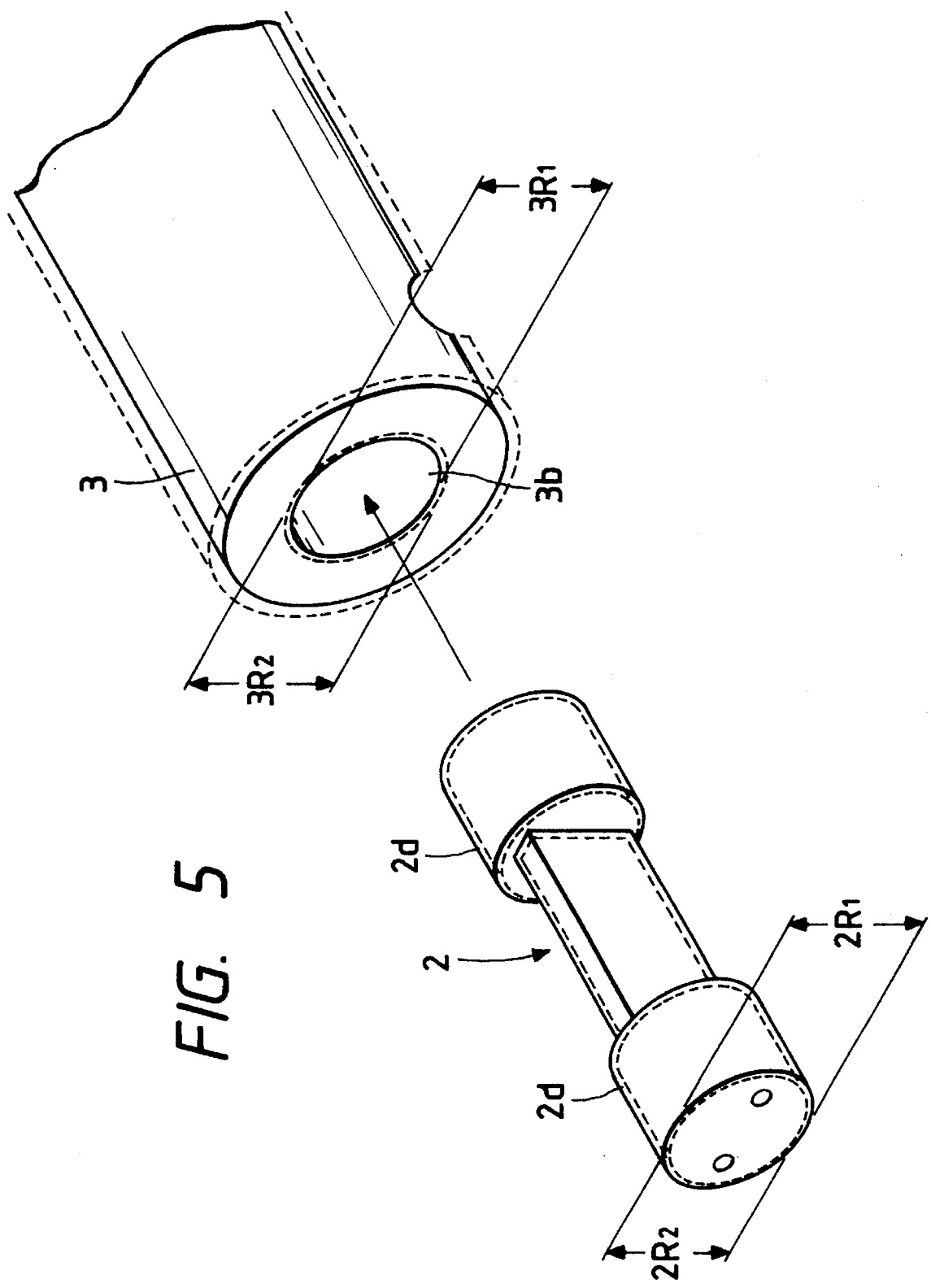
FIG. 5 is a perspective view for a description of a first example of a method of fixing the sensing element according to the first embodiment of the present invention.

FIG. 5 shows a first example of a method of fixing the sensing element 2 shown in FIG. 1. In FIG. 5, the sensing element 2 held at room temperature is indicated by the solid line, and the same sensing element 2 contracted being cooled at −150° C. or lower is indicated by the dotted line. Furthermore, in FIG. 5, the shackle pin 3 held at room temperature is indicated by the solid line, and the same shackle pin 3 expanded at about 80° C. is indicated by the dotted line.

The sensing element 2 is shaped as follows: At room temperature, the diameter $2R_1$ of the holders 2d of the sensing element 2 is slightly larger than the diameter $3R_1$ of the hole 3b of the shackle pin 3. In other words, the diameter $2R_1$ of the holders 2d of the sensing element and the diameter $3R_1$ of the hole 3b of the shackle pin 3 at room temperature are so determined that, when the holders 2d and the shackle 3 are heat-treated, the diameters $2R_2$ of the holders 2d is smaller than the diameter $3R_2$ of the hole 3b $(2R_2 < 3R_2)$.

Before the sensing element 2 is fitted into the hole 3b of the shackle pin 3, the former 2 is cooled to −150° C. or lower to reduce the diameter to $2R_2$, while the shackle pin 3 is heated to about 80° C. to increase the diameter of the hole 3b from $3R_1$ to $3R_2$. Under this condition, the sensing element 2 is fitted into the hole 3b of the shackle pin 3, after being aligned with the latter.

The sensing element and the shackle pin 3 are left as they are, until their temperatures become room temperature. That is, the sensing element 2 is expanded so that the diameter is changed from $2R_2$ to $2R_1$, while the shackle pin 3 is contracted so that the diameter is changed from $3R_2$ to $3R_1$. Hence, the sensing element 2 is positively fixed in the hole 3b of the shackle pin 3.

As is apparent from above description, the sensing element 2 expands uniformly in the hole 3b of the shackle pin 3. Therefore, the sensing element 2 is never abnormally deformed, and accordingly its characteristic is maintained unchanged.

The above-described method may be modified as follows: The shackle pin 3 is not heated; that is, it is held at room temperature before the sensing element 2 is inserted into the hole 3b of the shackle pin 3.

Figure 6A:
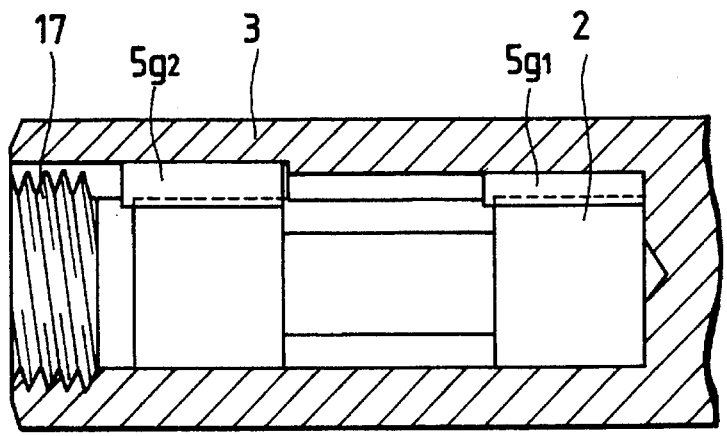
FIG. 6(a) is a sectional view of the sensing element fitted in a shackle pin of a second example of the method of fixing the sensing element according to the first embodiment of the invention.
Figure 6B:
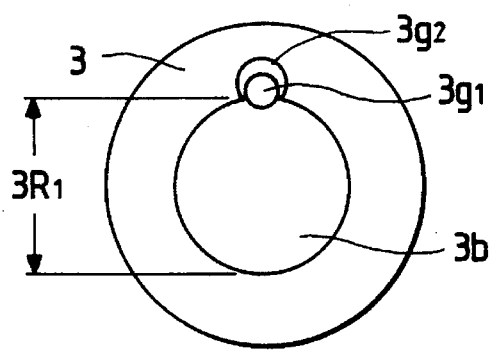
FIG. 6(b) is a front view of the shackle pin of the second example of the method of fixing the sensing element according to the first embodiment of the invention.

A second example of the method of fixing the sensing element 2 will be described with reference to FIG. 6.

Figure 6C:
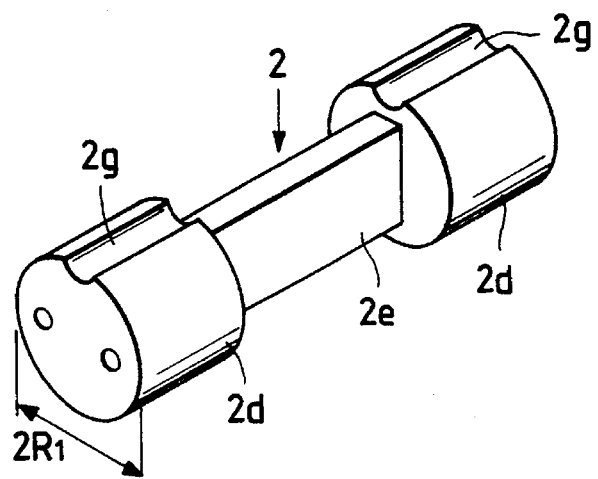
FIG. 6(c) is a perspective view of the sensing element of the second example of the method of fixing the sensing element according to the first embodiment of the invention.

In the method, the sensing element 2 and the shackle pin 3 are so designed that, at room temperature, the diameter $2R_1$ of the holders 2d of the sensing element is slightly smaller than the diameter $3R_1$ of the hole 3b of the shackle pin 3. As shown in FIG. 6(c), two grooves 2g semi-circular in section are formed in the surfaces of the right and left holders 2d of the sensing element, respectively, in such a manner that they are extended in the longitudinal direction of the sensing element. On the other hand, a groove $3g_1$ semi-circular in section is formed in the cylindrical surface of the hole 3b so as to confront with the groove 2g of one of the holders 2d, while a groove $3g_2$ semi-circular in section is formed in the cylindrical surface of the hole 3b so as to confront with the groove 2g of the other holder 2d. The groove $3g_2$ is such that its radius is slightly larger than that of the groove $3g_1$, and the circle of the groove $3g_1$ internally touches the circle of the groove $3g_2$.

The sensing element 2 is inserted into the hole 3b of the shackle pin 3 so that the grooves 2g are confronted with the grooves $3g_1$ and $3g_2$, respectively. Under this condition, as shown in FIG. 6(a), a small diameter spring pin $5g_1$ is inserted into the space defined by the confronted grooves, and a large diameter spring pin $5g_2$ is inserted into the space defined by the confronted grooves, to fix the sensing element 2 in the hole 3b of the shackle pin 3. Thus, the sensing element 2 has been positively fixed in the hole 3b of the shackle pin 3.

Now, a third example of the method of fixing the sensing element 2 will be described with reference to FIG. 7.

Figure 7A:
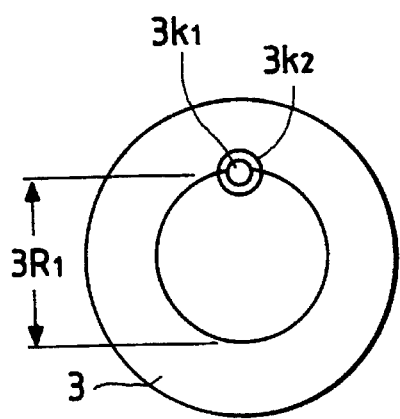
FIG. 7(a) is a front view of a shackle pin of a third example of the method of fixing the sensing element according to the first embodiment of the invention.
Figure 7B:
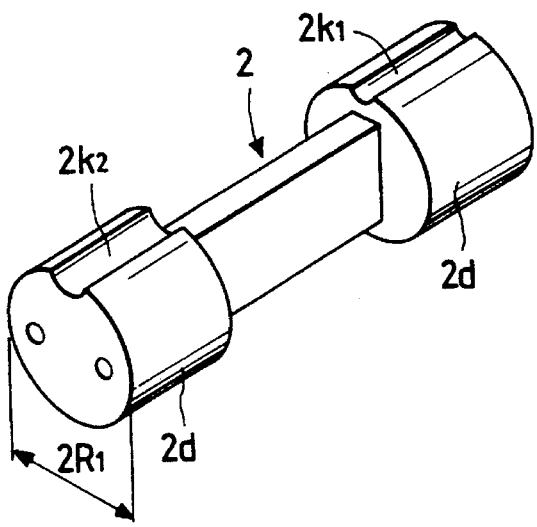
FIG. 7(b) is a perspective view of the sensing element of the third example of the method of fixing the sensing element according to the first embodiment of the invention.

In the method, the sensing element 2 and the shackle pin 3 are so designed that, at room temperature, the diameter $2R_1$ of the holders 2d of the sensing element is slightly smaller than the diameter $3R_1$ of the hole 3b of the shackle pin 3. As shown in FIG. 7(b), two grooves $2k_1$ and $2k_2$ semi-circular in section and different in radius are formed in the surfaces of the right and left holders 2d of the sensing element, respectively, in such a manner that they are extended in the direction of thrust of the sensing element. On the other hand, as shown in FIG. 7(a), a groove $3k_1$ semi-circular in section is formed in the cylindrical surface of the hole 3b so as to confront with the groove $2k_1$ of one of the holders 2d of the sensing element 2, while a groove $3k_2$ semi-circular in section is formed in the cylindrical surface of the hole 3b so as to confront with the groove $2k_2$ of the other holder 2d. The grooves $3k_1$ and $3k_2$ are coaxial with each other.

Under this condition, the sensing element 2 is inserted into the hole 3b of the shackle pin 3 until the grooves $2k_1$ and $2k_2$ confront with the grooves $3k_1$ and $3k_2$, respectively. Thereafter, similarly as in the case of FIG. 6(a), a spring pin $5g_1$ is inserted into the space defined by the grooves $2k_1$ and $3k_1$, and a spring pin $5g_2$ larger in diameter than the spring pin $5g_1$ is inserted into the space defined by the grooves $2k_2$ and $3k_2$, so that the sensing element 2 is fixedly secured in the hole 3b of the shackle pin 3.

A fourth example of the method of fixing the sensing element will be described with FIG. 8.

Figure 8A:
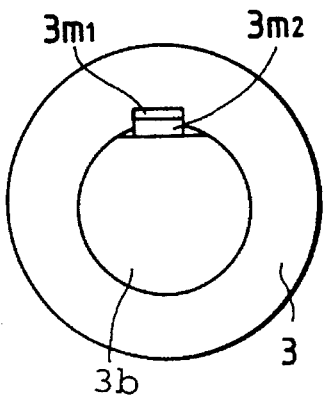
FIG. 8(a) is a front view of a shackle pin of a fourth example of the method of fixing the sensing element according to the first embodiment of the invention.
Figure 8B:
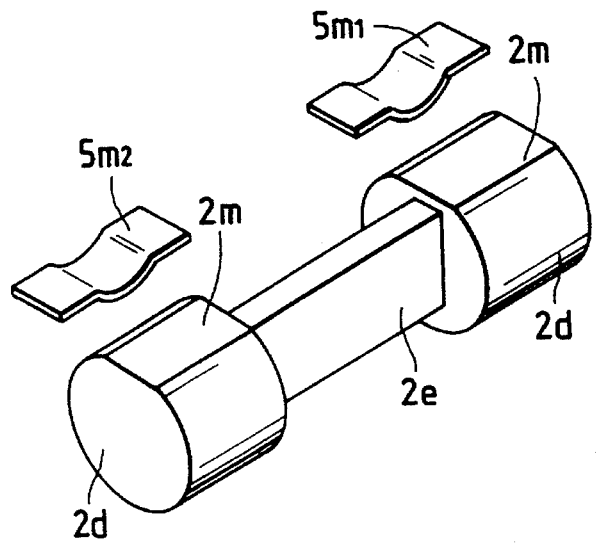
FIG. 8(b) is a perspective view of the sensing element of the fourth example of the method of fixing the sensing element according to the first embodiment of the invention.

In the method, the sensing element 2 and the shackle pin 3 are so designed that at room temperature the diameter $2R_1$ of the holders 2d of the sensing element 2 is slightly smaller than the diameter $3R_1$ of the hole 3b of the shackle pin. As shown in FIG. 8(b), the cylindrical surfaces of the holders 2d of the sensing element 2 are cut as indicated at 2m; that is, the holders 2d have cuts 2m, respectively. Furthermore, as shown in FIG. 8(a), a key groove $3m_1$ is formed in the cylindrical surface of the hole 3b of the shackle pin near the bottom so as to confront with the cut 2m of one of the holders 2d, while a key groove $3m_2$ larger than the key groove $3m_1$ is formed in the cylindrical surface of the hole 3b near the opening so as to confront with the cut 2m of the other holder 2d.

The sensing element 2 is inserted into the hole 3b of the shackle pin 3 until the cuts 2m of the holes 2d confront with the key grooves $3m_1$ and $3m_2$. Under this condition, similarly as in the case of FIG. 6(a), a key $5m_1$ is inserted into the space defined by the cut 2m and the key groove $3m_1$, and a key $5m_2$ larger than the key $5m_1$ is inserted into the space defined by the cut 2m and the key groove $3m_2$, so that the sensing element 2 is fixedly secured in the hole 3b of the shackle pin 3. Thus, the sensing element 2 has been positively held in the shackle pin 3.

In the above-described embodiments, the sensing element 2 is fixedly secured in the hole 3b of the shackle pin 3; however, the invention is not limited thereto or thereby. That is, the technical concept of the invention may be applied to the case where the sensing element is fixedly fitted in a hole formed in a trunnion shaft or the like to which the vehicle load is applied as a shearing force.

Now, a method of fixing the sensing element 22 shown in FIG. 2 will be described with reference to FIG. 9, in which parts corresponding functionally to those which have been described with reference to the prior art are therefore designated by the same reference numerals or characters.

Figure 9:
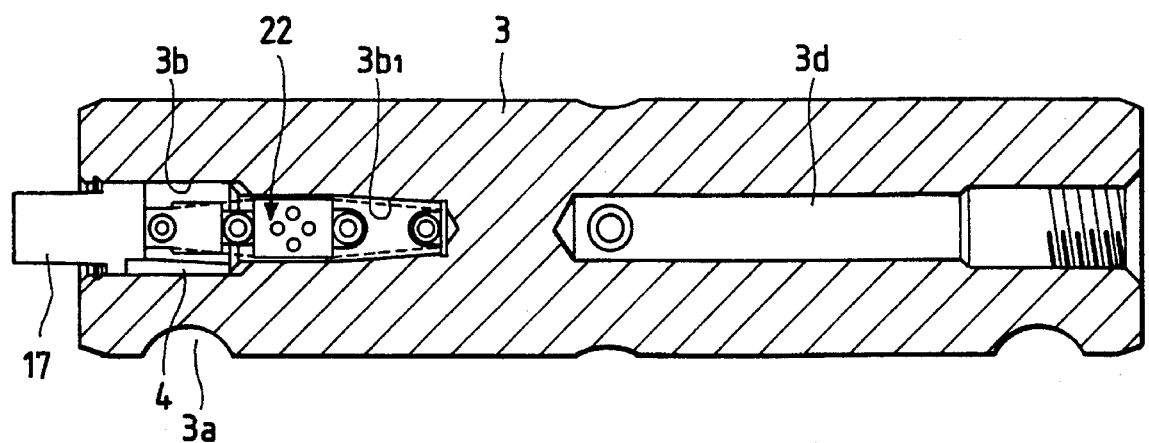
FIG. 9 is a sectional view for a description of a method of fixing the sensing element according to the fifth embodiment of the present invention.

As shown in FIG. 9, the hole 3b of the shackle 3 consisting of two parts different in diameter. One of the two parts is smaller in diameter and deeper than the other, and is tapered as indicated at $3b_1$. The sensing element 22 is fixed in the hole 3b as follows: An adhesive agent is applied to the surface of the sensing element 22, and then the latter 22 is inserted into the hole 3b beginning with the tapered holder $22d_a$ until it is stopped. Under this condition, a wedge-shaped key 4 is inserted into the key groove $22d_2$, so that the sensing element is fixedly held in the hole 3b of the shackle pin 3.

As was described above, with the sensing element of the invention, its detection value is scarcely affected even when the vector of the load applied to the vehicle changes in direction. Furthermore, the sensing element can be positively fixed in the hole of the pin or shaft according to the sensing element fixing method of the invention.

What is claimed is:

1. A strain detecting sensing element comprising:

a pair of cylinder holders, one being a circular-truncated-cone-shaped holder, the end portion of the circular-truncated-cone-shaped holder being tapered; and a plate-shaped member between the two holders on which a coil is provided at a center portion thereof, wherein one of said cylindrical holders has a key groove in an outer surface thereof in the longitudinal direction, and lead wire grooves through which lead wires of the coil are extended.

2. A method for fixing a sensing element comprising the steps of:

forming a hole in a cylindrical pin or shaft in the longitudinal direction thereof to which a load is applied as shearing force;

cooling the sensing element to contract it, and then fitting the sensing element into the hole provided in the pin or shaft; and expanding the sensing element so as to be fixedly secured in the hole of the pin or shaft, wherein the pin or shaft is expanded by heating before the sensing element is fitted in the hole of the pin or shaft, and wherein the sensing element is substantially cooled to about −150° C. or lower, and the pin or shaft is substantially heated to 80° C.

3. A sensing element in a load measuring device comprising:

a pair of cylindrical holders, each having a hole along the central axis; and a plate-shaped member between the two cylindrical holders, the plate-shaped member having protrusions at both ends, a wire being wound on a center portion of the plate-shaped member, wherein one of said cylindrical holders is circular-truncated-cone shaped and the other cylindrical holder has a key groove and a lead wire groove through which lead wires of the coil are extended.

4. A sensing element in a load measuring device as claimed in claim 3, further comprising:

an arm connected to a pair of cylindrical holders to form them in integrally shaped.

5. A sensing element as claimed in claim 3, wherein the plate-shaped member is welded to the cylindrical holders.

6. A sensing element as claimed in claim 3, wherein the plate-shaped member is secured by a pin to the cylindrical holders.

* * * * *